DIGITAL TO ANALOG CONVERTER

Filed July 10, 1967

INVENTOR.
VERNON E. SCHMIDT
BY
Oldham & Oldham
ATTORNEYS

United States Patent Office 3,509,556
Patented Apr. 28, 1970

3,509,556

DIGITAL TO ANALOG CONVERTER

Vernon E. Schmidt, Akron, Ohio, assignor to Goodyear Aerospace Corporation, Summit, Ohio, a corporation of Delaware Filed July 10, 1967, Ser. No. 652,341
Int. Cl. H03k 13/02
U.S. Cl. 340—347 6 Claims

ABSTRACT OF THE DISCLOSURE

A network capable of being adjusted by digitized angular information in such a way that it will operate on an analog voltage input with gains that produce two outputs proportional to the sine and cosine of the digital angle. This is accomplished by utilizing a plurality of modules, each associated with the one digit of the digital angular information whereby the modules are serially arranged and sequentially add or provide a gain representing the angular information of their particular digit to the analog input voltage, if they are energized, whereby the sum resultant is equal to the angular digital signal in analog form.

PRIOR ART

Heretofore, it has been recognized that electronic digital to analog voltage converters are helpful in the computer art to eliminate equipment as to size and expense to convert digital angular signals. Some of these prior art equipments are indicated in U.S. Patents Nos. 3,241,-133; 3,267,265; and 3,277,464. The structure utilized in the instant invention distinguishes from these prior art refences, however, by utilizing a plurality of modules, wherein each module handles a particular angular digit of the digital input produce sine and cosine output information in analog form. None of these references utilize the module technique, wherein the modules can be readily adjusted to particular digital input information, and can handle any angle with great reliability, fast response, and where the equipment is of minimum cost.

Patent No. 3,267,265 utilizes binary multipliers to achieve a plurality of binary intelligence signals, which has been essentially the conventional way to do it in the past, as pointed out beginning on pp. 494 in "Digital Computer Components and Circuits" by R. K. Richards, and in Section 14–3 in "Analog Computers" by A. S. Jackson (1960). Patent No. 3,277,464 relates to a digital to synchro converter which utilizes trigonometric functions computed by the use of resistors and triggered by digital binary input signals to generate an analog function. However, this patent utilizes a complex network to generate correct analog signals in those areas of sine and cosine curves which are non-linear. These adjusting features in this patent, as well as the complex manner in which the quadrant selection is achieved are greatly simplified in the instant invention by utilizing summers with appropriate logic to achieve a precise analog signal with less than 1% error for any digital binary or radian input signal.

The objects of the invention are achieved by providing in a digital to analog converter the combination of a plurality of modules arranged in series where each module includes a pair of amplifier means each designed to amplify an input signal by an amount representative of either the sine or cosine of a preselected angle, and means to sum the resultant signals to provide a first output signal, and means to subtract the resultant signal amplified with the amount representative of the sine from the other signal to provide a second output signal, means to control the energization of each module with angular digital information, and means to insert an analog electrical signal into the first module to be acted upon by the amplifier means thereof and to sequentially pass such resultant signal to every other module whereby the resultant first and second output signals represent the digital information in analog form.

For a better understanding of the invention, reference should be had to the accompanying drawings wherein.

THEORY OF THE INVENTION

The converter defined hereinafter is an active network capable of accepting angular information in digital form, and converting it to analog voltages proportional to the sine and cosine of the digitized angle set into it. The two analog output voltages can be made suitable for use with synchro resolvers, X–Y plotters, and many other analog devices. The angular input may be from an angular position encoder, a computer or any of a wide variety of digital equipment.

Figures 1, 2:
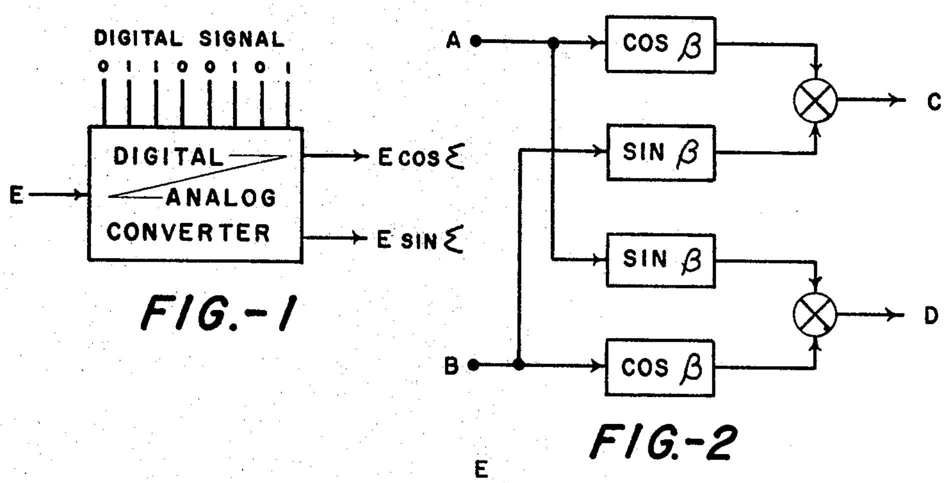
FIGURE 1 is a block diagram indicating the analog and digital inputs to the converter which generate the analog output signals desired by the invention.
FIGURE 2 is a functional block diagram illustrating the logic circuitry necessary to achieve solution to the fundamental relationships of the invention.
Figure 3:
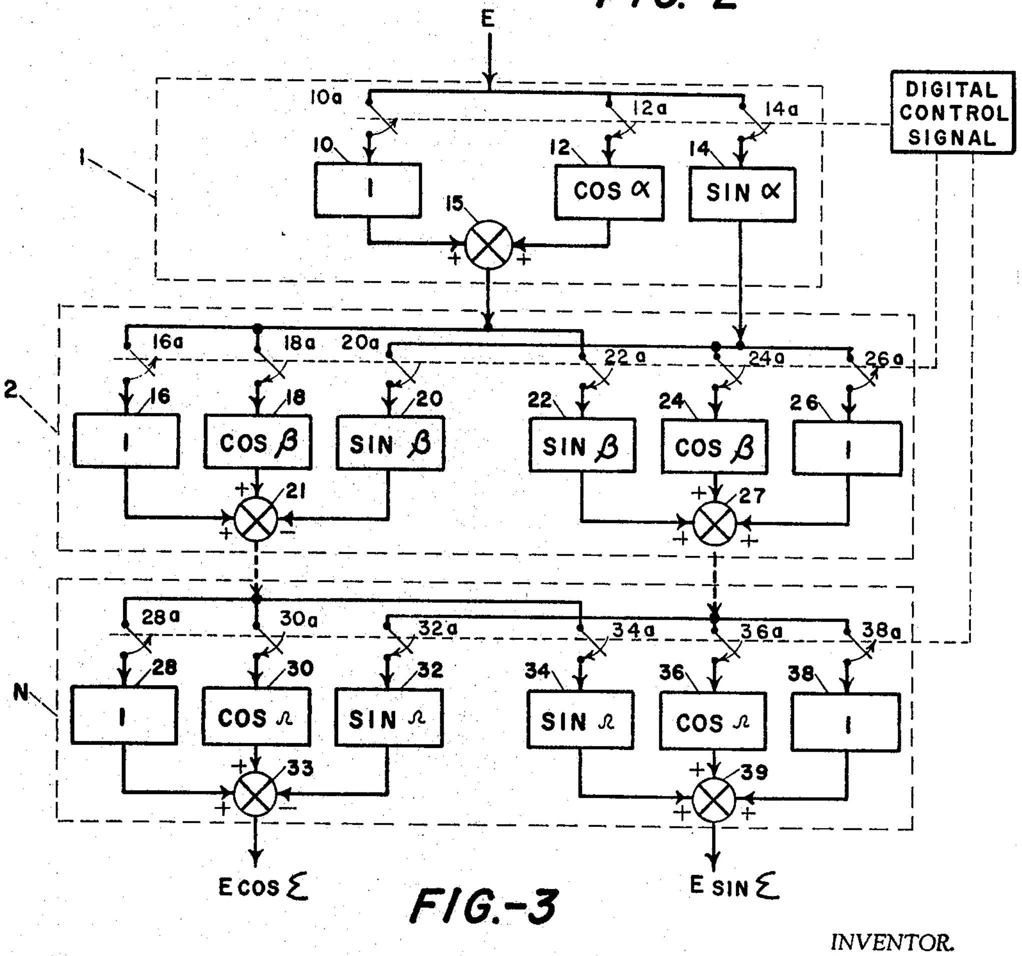
FIGURE 3 is a schematic block diagram illustrating the relationship of the series aligned modules within the converter, and how each module feeds in succession to the next in order to achieve the resultant desired analog output signals.

FIGURE 1 illustrates the basic operation of the invention which includes a signal E into the converter indicated generally by block 1. A digital signal indicated generally by numeral 2 is applied to thus produce analog output signals impressed on the E input as $E \cos \Sigma$ and $E \sin \Sigma$.

The theory of the digital to analog resolver is based on the following two trigonometric identities:

$$\text{Cos}\ (\alpha+\beta)=\cos\alpha\cos\beta-\sin\alpha\sin\beta \qquad (1)$$

$$\text{Sin}\ (\alpha-\beta)=\sin\alpha\cos\beta+\cos\alpha\sin\beta \qquad (2)$$

The identities defined in Equations 1 and 2 above can be generated from electronic circuitry in a manner shown in FIGURE 2 of the drawings. Essentially, A and B are inputs, C and D are outputs, "cosine $\beta$" and "sine $\beta$" are gains. The outputs C and D can be represented in terms of the inputs and gains as follows:

$$C=A\cos\beta+B\sin\beta \qquad (3)$$

$$D=B\cos\beta-A\sin\beta \qquad (4)$$

If A and B are equal respectively to $E$ sine $\alpha$ and $E$ cosine $\alpha$ where $\alpha$ is an arbitrary angle then C and D become $$C=E\sin(\alpha+\beta)=E\sin\alpha\cos\beta+E\cos\alpha\sin\beta \qquad (5)$$

$$D=E\cos(\alpha+\beta)=E\cos\alpha\cos\beta-E\sin\alpha\cos\beta \qquad (6)$$

Since the outputs C and D are $E\sin(\alpha+\beta)$ and $E\cos(\alpha+\beta)$ respectively, they can be used to drive another similar section. Theoretically, any number of segments of this kind can be cascaded in various combinations by switching them in and out to produce functions of any angle with an extremely high degree of accuracy.

DESCRIPTION OF OPERATIONAL ARRANGEMENT OF FIGURE 3

The line of three blocks or amplifiers 10, 12, and 14 at the top of the diagram represents the essential structure of the first module 1 in the cascade. Each of the amplifiers 10, 12, and 14 has a switch 10a, 12a, and 14a associated therewith which is normally open or closed depending upon its respective digital control signal which in this instance is indicated in the ONE state and operates on each switch through the dotted line indication of the drawing. An analog input signal E is applied to each of the amplifiers. If the first module is in the ZERO state the input signals are applied directly through the amplifier 10 to provide a gain of "one" which in effect passes on the inputs unaltered to the next module 2. The outputs from amplifiers 10 and 12 pass to a summer 15, with the output thereof passing to module 2.

The module 2 has three amplifiers (16, 18, 20), and (22, 24, 26) associated with each summer since it is necessary to incorporate a gain of "one" for direct passage through if there is no input represented by a ZERO digital control signal. However, this module 2 is illustrated as having the digital control signal in ONE state which makes the normally closed switches 18*a*, 20*a*, 22*a*, and 24*a* apply to the cosine and sine amplifiers in each respective side, as illustrated.

The outputs of the module 2 are applied to other modules in the series, with the total number of modules equaling the total number of digits in the digital signal, whereby the output from the last module N is a summation of all the digital control signals which are in the ONE state. The structure of the module N is exactly like module 2 except that the amplifiers (30, 32) (34, 36) apply their own sine or cosine angular information.

In order to achieve the necessary logic to solve the equations listed above the outputs of amplifiers 16, 18, and 20 are applied to be added or subtracted together in summer 21, as indicated by the appropriate signs. Similarly, the outputs of amplifiers 22, 24, and 26 are applied to summer 27. The signal from summer 21 is sent to amplifiers 28, 30, and 34, while that from summer 27 is sent to amplifiers 32, 36, and 38. Again, summers 33 and 39 are provided to receive the respective outputs of the amplifiers in module N. The resultant output of summer 33 is $E \cos \Sigma$ and from summer 39 is $E \sin \Sigma$.

With respect to a system or module arrangement for binary coded digital angles the ratio of the magnitudes in successive modules is 2 to 1. This $\beta=2\alpha$, $\gamma=2\beta$ and $\Omega=2^{N-1}\alpha$ where N is the total number of modules. Thus, in a ten module unit the following angles will be used to provide a full 360° resolver rotation.

| Module | Angle | | Function Sin | Function Cos |
|---|---|---|---|---|
| 0 | 0 | 0 | 0 | 0 |
| 1 | .3515 | 21.1′ | .00614 | .99998 |
| 2 | .7031 | 42.2′ | .012278 | .99993 |
| 3 | 1.4062 | 1°24.41 | .024554 | .99970 |
| 4 | 2.8125 | 2°48.75′ | .04906 | .99879 |
| 5 | 5.625 | 5°37.5 | .09801 | .995185 |
| 6 | 11.25 | 11°15′ | .19509 | .98079 |
| 7 | 22.5 | 22°30′ | .38268 | .92388 |
| 8 | 45 | 45° | .70711 | .70711 |
| 9 | 90 | 90° | 1.0000 | 0.0000 |
| 10 | 180 | 180° | 0.0000 | −1.0000 |

For practical equipment reasons the first module 1 representing the smallest angle is designed to take advantage of the fact that the sine of a small angle is approximately equal to its angle in radians and the cosine is nearly equal to one. It is therefore possible that several of the very small angles, in fact the first three in the table listed above could be approximated by their angle values, and the sine of the sum approximated by the sum of the angles. In contrast, the cosine being approximated by unity could be mechanized by connecting the analog input directly to module 2. The resultant output from the summers 33 and 39 of module N represent the digital information in analog form.

Therefore, it is seen that the digital to analog converter is achieved by utilizing a module setup wherein sine and cosine information for the particular angle represented by each digit is appropriately summed to achieve trigonometric functions which may be further summed together in order that the total angle represented by the digital information is represented in analog form by the resultant outputs from the sequentially applied modular information. The summing and amplifying functions are conventionally known in the art, and are normally performed by single units such as transformers or appropriate resistor networks and differential amplifiers. For example, transformers appropriately set to impress upon the analog electrical signal changes in the voltage thereof representative of the digital information could be the amplifier means necessary to achieve the objects of the invention.

Thus, by switching modules in or out of the circuit as their corresponding digit is ONE or ZERO it is possible to generate $$e_{\text{in}} \cos {}_{i=0}{}^{n}\theta_i$$

$$e_{\text{in}} \sin {}_{i=0}{}^{n}\theta_i$$

where $n$ is the number of "ones" in the number, and $\theta_i$ is the value of the angular increment represented by each "one." The digital to analog resolver makes it possible to produce signals proportional to sine and cosine of the digitized angle without using valuable digital computer time and equipment to compute these functions of the angle. By building the device to accept an A-C signal (400 c.p.s. for example) as its analog input it becomes possible to produce synchro signals from digital angle information without elaborate follow-up servo equipment.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a digital to analog converter the combination of a plurality of modules arranged in series where each module includes:

a pair of amplifier means each designed to amplify an input signal by an amount representative either of the sine or cosine of a preselected angle, and means to sum the resultant signal to provide a first output signal, and means to subtract the resultant signal amplified with the amount representative of the sine from the other signal to provide a second output signal, means to control the energization of each module with angular digital information, and means to insert an analog electrical signal into the first module to be acted upon by the amplifier means thereof and to sequentially pass such resultant signal to every other module whereby the resultant first and second output signals represent the digital information in analog form.

2. A converter according to claim 1 wherein the number of modules equals the number of digits in the digital signal to be converted, and wherein the actuation of each module is dependent upon the state of its corresponding digit.

3. A converter according to claim 2 where those digits representing angles small enough to substantially equal the radian of the angle itself are summed together in a single module.

4. A converter according to claim 1 where the amplifier means are transformers appropriately set to impress upon the analog electrical signal appropriate changes in the voltage thereof to make them representative of the angular information represented by the particular digit to which they are associated.

5. A converter according to claim 4 where the amplifier means and summations are accomplished with resistor networks and differential amplifiers.

6. In a digital to analog converter the combination of series of modules arranged in series where each module includes means designed to impress upon an input signal a voltage representative of either the sine or cosine of a selected angle to produce two signals, and means to sum the resultant signals to provide a first output signal, and means to subtract the resultant signal impressed with an amount representative of the sine from the other signal to provide a second resultant output signal, means to control the energization of each module with angular digital information, and means to sequentially pass the first and second resultant output signals onto each sequential module to have the respective sine and cosine information input to each module from its respective digital information impressed upon the signals.

References Cited

UNITED STATES PATENTS

| | | |
|---|---|---|
| 3,376,570 | 4/1968 | Lawson. |
| 3,295,125 | 12/1966 | Idelsohn. |
| 3,277,464 | 10/1966 | Naydan. |
| 3,241,133 | 3/1966 | Herzl. |

MAYNARD R. WILBUR, Primary Examiner

J. GLASSMAN, Assistant Examiner

U.S. Cl. X.R.

235—150.53, 154